Nov. 16, 1965 M. FARBER 3,218,387

APPARATUS FOR CORRECTION OF HALF-TONE COLOR IMAGES

Filed April 16, 1962 2 Sheets-Sheet 1

Nov. 16, 1965 M. FARBER 3,218,387

APPARATUS FOR CORRECTION OF HALF-TONE COLOR IMAGES

Filed April 16, 1962 2 Sheets-Sheet 2

United States Patent Office 3,218,387

Patented Nov. 16, 1965

3,218,387

APPARATUS FOR CORRECTION OF HALF-TONE COLOR IMAGES

Monroe Farber, Jericho, N.Y., assignor to Fairchild Camera and Instrument Corporation, a corporation of Delaware Filed Apr. 16, 1962, Ser. No. 187,794
6 Claims. (Cl. 178—5.4)

Figure 1:
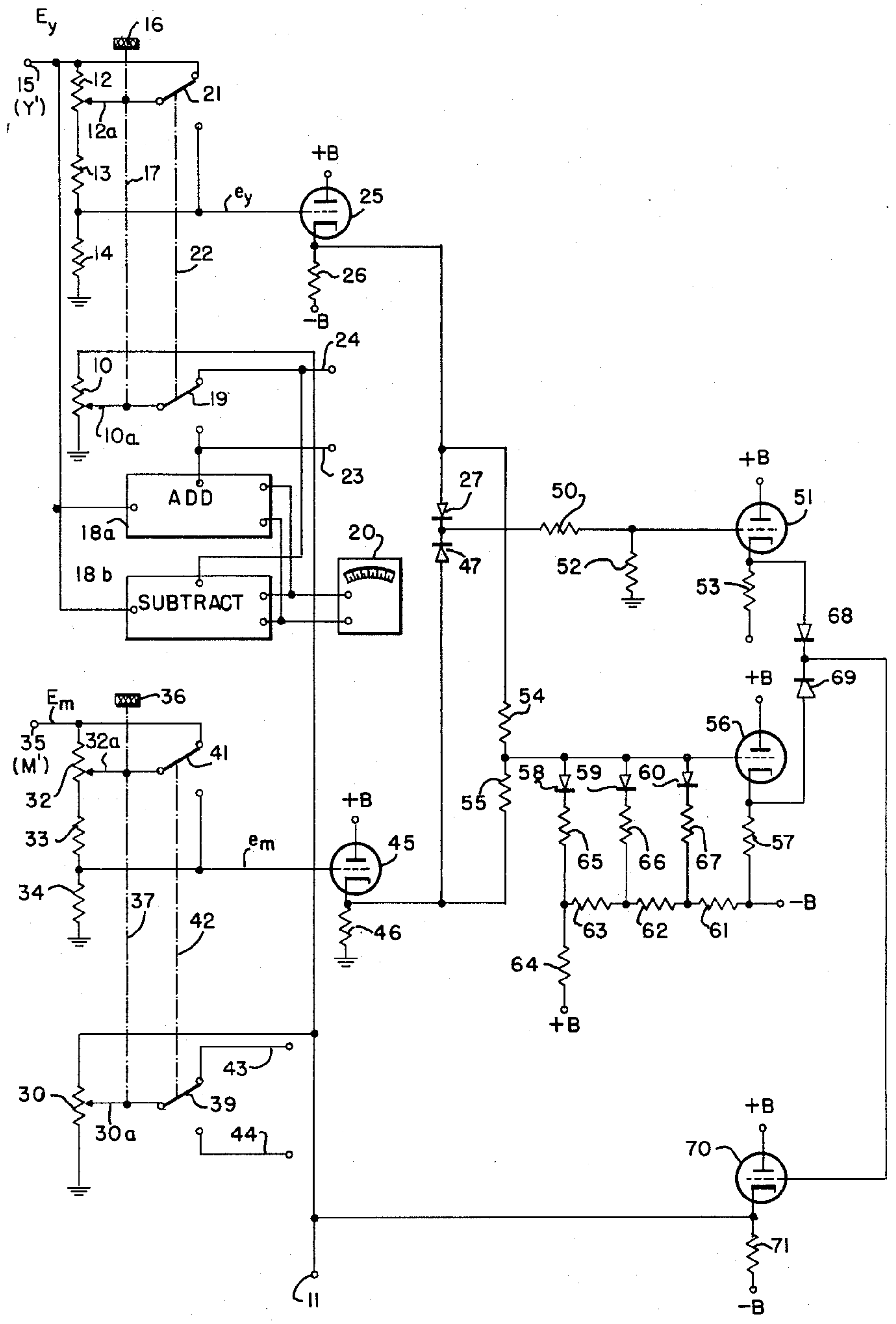

This invention relates to apparatus for the correction of half-tone color images and more particularly to the correction of errors of color purity, dominant wavelength, and luminance due to nonlinearities arising primarily from multicolor over-printing, that is, overlapping dot areas of the different color half-tone patterns.

In applicant's copending application Serial No. 102,873, filed April 13, 1961, there is described and claimed apparatus for introducing into a half-tone color-reproducing system corrections taking into account the departures of ordinary commercial printing inks from ideal primary colors. The invention of that application, in general, is directed to the computation of the black printer dot area (density) from the equivalent neutral density of the original image, as altered by any prior modification to fit the printing conditions, and to the computation of the color printer-separation dot areas (densities), which are in part dependent on the black printer dot area (density), to effect a reproduced color image having the characteristics called for by the signals derived from the original copy, which may or may not be corrected as described in a copending application of applicant and Vernon L. Marquart, Serial No. 12,088, filed March 1, 1960.

The present invention, in general, is directed to the computation of necessary corrections of signals derived from the original copy, which may or may not be corrected as described in the aforesaid copending applications of applicant and of applicant and Marquart, to compensate for nonlinearities of the reflectivities of the paper, either upon laying down a single color ink or upon laying down overlapping or over-printing multiple color inks. The invention is applicable generally to image reproduction by printing processes, for example, by ordinary letterpress, intaglio, offset, gravure, and equivalent printing processes.

It is an object of the invention, therefore, to provide a new and improved apparatus for the correction of half-tone color images reproduced by printing or analogous processes to compensate for nonlinearities in the reflectivity of the paper or other printing medium, both for the laying down of a single color ink half-tone pattern or the laying down of multiple color ink half-tone patterns which may be partially or totally overlapping or over-printed.

It is another object of the invention to provide a new and improved apparatus for the correction of half-tone color images reproduced by printing or analogous processes by means of which the color-separation printers are effective to reproduce the color image without any shift in color purity, dominant wavelength, or luminance due to nonlinearities in the reflectivity of the paper or other printing medium, both for the laying down of a single color ink half-tone pattern or the laying down of multiple color ink half-tone patterns which may be partially or totally overlapping or over-printed.

In accordance with the invention, there is provided an apparatus for developing a density-factor correction for the reproduction of half-tone color images by printing processes to compensate for errors due to multicolor over-printing comprising at least two input terminals for supplying signals individually continuously representative of a corresponding number of primary color components of a scanned color copy and a first plurality of circuit means coupled to selected of the input terminals for deriving a plurality of signals each individually representative of the color component corresponding to its associated terminal appearing in each color over-print including that primary color. The apparatus further comprises a second plurality of circuit means each coupled to the first circuit means for summing all of the derived signals corresponding to a given color component and circuit means for algebraically combining the signal appearing at each input terminal with the corresponding signal developed by one of the second circuit means to develop the corrected color signal. The term "half-tone color images" is used herein and in the appended claims in its generic sense to refer to images reproduced by printing processes in which the reproduced image is broken up into elemental areas either of variable area, as in letterpress printing, or variable depth, as in gravure or intaglio printing, and is to be distinguished from continuous tone images such as reproduced by photographic processes.

Further in accordance with the invention, there is provided in an apparatus for developing a density-factor correction for the reproduction of half-tone color images by printing processes to compensate for errors due to multicolor over-printing, an over-print correction computer comprising first input terminals for supplying a first signal individually representative of $Z^1$, second input terminals for applying a second signal individually representative of $Z^2$, a first circuit coupled to the first input terminals including means adjustable in accordance with the factor $(1-Z^1_{1,2})$ for deriving a third signal, and a second circuit coupled to the first input terminals including means adjustable in accordance with the factor $Z^1/Z^1_{1,2}$ for deriving a fourth signal. The computer further comprises a third circuit coupled to the second input terminals including means adjustable in accordance with the factor $Z^2/Z^2_{1,2}$ for deriving a fifth signal, where the several parameters have the significance recited hereinafter, and circuit means for deriving a correction signal representative approximately of the product of the three derived signals.

For a better understanding of the present invention, together with other and further objects thereof, reference is had to the following description taken in connection with the accompanying drawings, while its scope will be pointed out in the appended claims.

Figure 2:
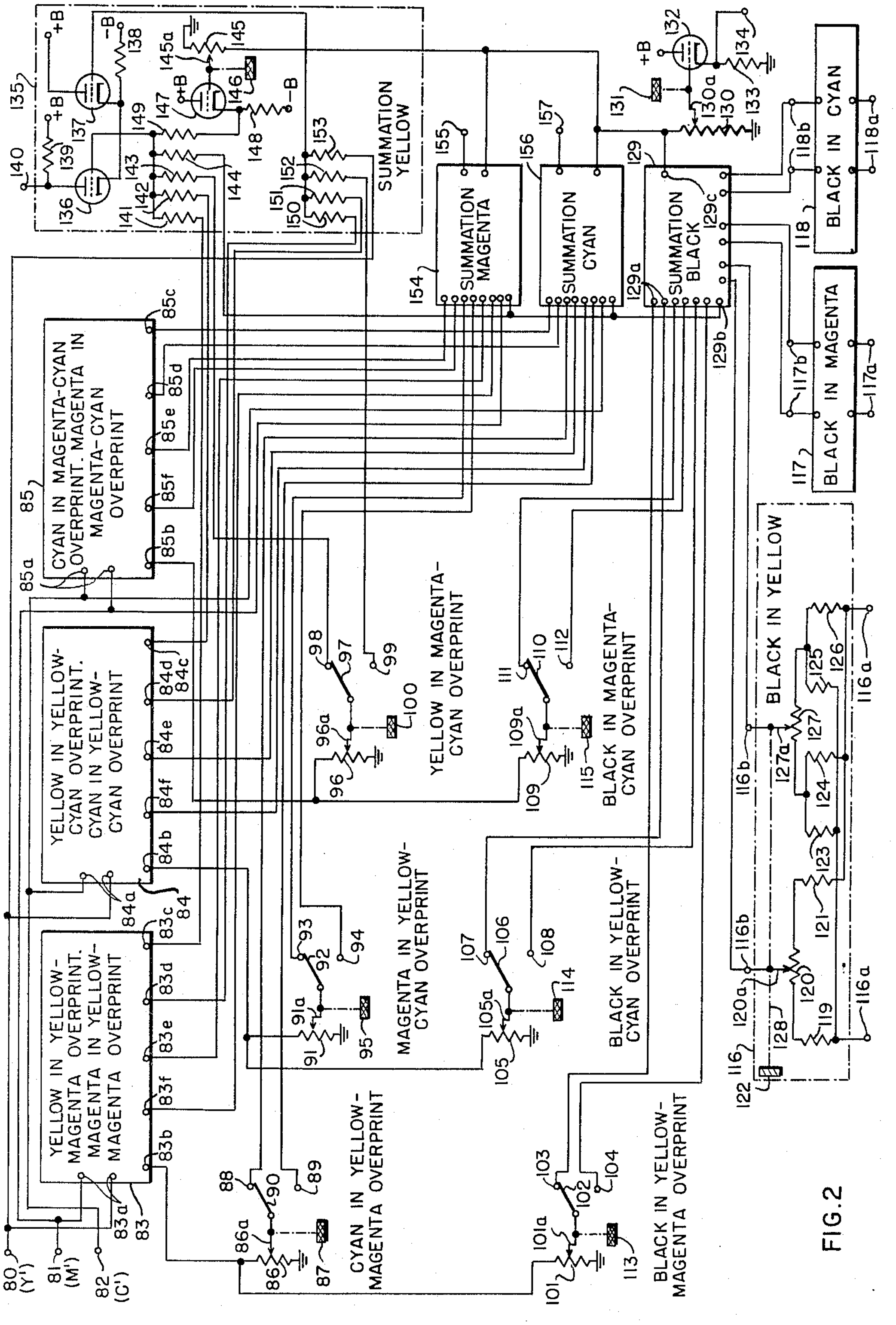

Referring to the drawings:

FIG. 1 is a circuit diagram of an over-print correction computer useful in the system of the invention, while FIG. 2 is a schematic diagram of a complete apparatus for developing the desired density-factor corrections.

Before describing specifically the apparatus for carrying out the invention, it is believed that it would be helpful to give an explanation of the principles underlying the invention and a brief mathematical explanation of the derivation of the basic relationships that should be satisfied in developing information for the correction of the densities of the color-separation printers.

In the following analysis, it is assumed that the photoelectric pickup scanning the original image develops signals representative of the primary color components red, green, and the blue (R, G, B); that image reproduction is to be effected by printing processes using the complementary subtractive primary color components yellow, magenta, and cyan (Y, M, C), and that the black printer is considered as the means of adding the required amount of neutral density to the reproduced color image developed from the color signals, modified by undercolor removal.

When printing inks of different colors are laid down in a half-tone pattern on a printing medium, either as a single color half-tone pattern or as multiple color half-tone patterns in which the individual dot areas partially or entirely overlap or are over-printed, the resulting printed image will ordinarily include shifts in the luminance, dominant wavelength, and color purity due to the nonlinearities in the reflectivity of the printed paper under the various printing conditions.

The reflectivity Z of the printed paper to any one of the tristimulus set of reflectivities red, green, or blue (R, G, or B) may be determined from the well-known Neugebauer Equations ("Die theoretischen Grundlagen des Mehrfarbenbuchdrucks," Zeitschrift fur wissenschaftliche Photographie Photophysik and Photochemie, Vol. 36, No. 4, p. 73 (1937)). One form which these equations may take is $$\begin{aligned}Z=&Z_p-Y(Z_p-Z_y)-M(Z_p-Z_m)-C(Z_p-Z_c)\\&+YM(Z_p-Z_y-Z_m+Z_{ym})+YC(Z_p-Z_y-Z_c\\&+Z_{yc})+MC(Z_p-Z_m-Z_c+Z_{mc})\\&-YMC(Z_p-Z_y-Z_m-Z_c+Z_{ym}+Z_{yc}\\&+Z_{mc}-Z_{ymc})\end{aligned} \quad (1)$$

where:

Subscripts $p$, $y$, $m$, and $c$ refer to paper, yellow, magenta, and cyan, respectively;

Y, M, C are the relative dot areas for the yellow, magenta, and cyan printings, respectively;

$Z_{ym}$, $Z_{yc}$, $Z_{mc}$ are the reflectivities for the two-color overprinted areas, and $Z_{ymc}$ is the reflectivity of areas over-printed with the three colors.

The first line of Equation 1 represents conditions for one ink at a time ($Y=M=0$, or $Y=C=0$ or $M=C=0$).

In Equation 1, the desired quantities, Y, M, and C appear as implicit variables. It is also understood that homologous equations are required to represent dot areas corresponding to each of the R, G, and B inputs signals. From Equation 1 there may be derived the relations:

$$\begin{aligned}Y=&Y'+(1-Y'_{ym})YM(1-C)+(1-Y'_{yc})YC(1-M)\\&-Y'_{mc}MC(1-Y)+(1-Y'_{ymc})YMC\end{aligned}$$

$$\begin{aligned}M=&M'+(1-M'_{ym})YM(1-C)\\&+1-M'_{mc})MC(1-Y)-M'_{yc}YC(1-M)\\&+(1-M'_{ymc})YMC\end{aligned} \quad (3)$$

$$\begin{aligned}C=&C'+(1-C'_{yc})YC(1-M)+(1-C'_{mc})MC(1-Y)\\&-C'_{ym}YM(1-C)+(1-C'_{ymc})YMC\end{aligned} \quad (4)$$

where:

Y' represents dot area where on linear relations;

$Y'_{ym}$, $Y'_{yc}$, $Y'_{mc}$ represent values of Y' when scanning two-color over-prints; and $Y'_{ymc}$ represents value of Y' when scanning three-color over-prints.

In the event the color-correcting apparatus of applicant's aforesaid copending application Serial No. 102,873 precedes the apparatus of the instant application in a complete color-signal processing system, the Y', M', and C' signals are supplied by the processing equipment of that copending application, as determined by Equation 7 of that application.

Again, it is noted that in Equations 2, 3, and 4, the desired parameters Y, M, and C appear as implicit functions so that a rigorous instrumental solution of these equations becomes extremely difficult, invloving complex variable feedbacks. However, a reasonable approximation may be obtained by certain simplifying assumptions. First, it may be assumed that the third factor of each of the two-color over-print terms (factors $(1-Y)$, $(1-M)$, $(1-C)$) may be neglected and the corresponding factor can be inclined in the three-color over-print correction, if required. Secondly, it can be assumed that the implicitly included factors YM, YC, and MC may be approximated by the expressions $$\frac{Y'}{Y'_{ym}}\cdot\frac{M'}{M'_{ym}},\ \frac{Y'}{Y'_{yc}}\cdot\frac{C'}{C'_{yc}},\ \text{and}\ \frac{M'}{M'_{mc}}\cdot\frac{C'}{C'_{mc}}$$

respectively.

With the foregoing simplifying assumptions, Equation 2 becomes:

$$\begin{aligned}Y=&Y'+(1-Y'_{ym})\frac{Y'}{Y'_{ym}}\cdot\frac{M'}{M'_{ym}}+(1-Y'_{yc})\frac{Y'}{Y'_{yc}}\cdot\frac{C'}{C'_{yc}}\\&-Y'_{mc}\frac{M'}{M'_{mc}}\cdot\frac{C'}{C'_{mc}}\end{aligned} \quad (5)$$

Homologous expressions for M and C may be similarly derived from Equations 3 and 4 in forms similar to Equation 5.

Similarly, it can be shown that the black or neutral-density factor K, necessary to correct for undesired black components in the resulting reproduced image caused by the departure of the printing inks and the paper from the ideal characteristics, may be represented by the relation:

$$\begin{aligned}K=&K_0+(1-K'_{ym})\left(\frac{Y'}{Y'_{ym}}\cdot\frac{M'}{M'_{ym}}\right)+(1-K'_{yc})\frac{Y'}{Y'_{yc}}\cdot\frac{C'}{C'_{yc}}\\&-(1-K'_{mc})\frac{M'}{M'_{mc}}\cdot\frac{C'}{C'_{mc}}\end{aligned} \quad (6)$$

Equation 5 may be further simplified by considering only one of the two-color over-print terms at a time. An illustrative elementary circuit instrumentation of one term of Equation 5 is represented in FIG. 1 of the drawings, including provisions for switching certain circuit elements for two different ranges of input signal amplitudes in accordance with variations in operating conditions. Consider initially the first and second terms of Equation 5 for the Y and M signals, the terms Y' and M' constituting the input signals of the system representative of the yellow and magenta dot areas (density) respectively:

$$Y=Y'+(1-Y'_{ym})\cdot\frac{Y'}{Y'_{ym}}\cdot\frac{M'}{M'_{ym}} \quad (7)$$

$$M=M'+(1-M'_{ym})\cdot\frac{Y'}{Y'_{ym}}\cdot\frac{M'}{M'_{ym}} \quad (8)$$

Generalizing, the output signal Z, corrected for any given two-color over-print, may be determined from the expression:

$$Z=Z^1+(1-Z^1_{1,2}\cdot\frac{Z^1}{Z^1_{1,2}}\cdot\frac{Z^2}{Z^2_{1,2}} \quad (9)$$

where the superscripts refer to individual primary color components and the subscripts refer to the over-print colors.

Instrumentation of the second term of Equation 7 will include factors representative of Y', M', $Y'_{ym}$, and $M'_{ym}$ while instrumentation of Equation 8 will include factors Y', M', $Y'_{ym}$, and $M'_{ym}$. The over-print factors $Y'_{ym}$ and $M'_{ym}$ are known or determined from the known characteristics of the printing inks and the reflectivity of the paper being used. This instrumentation can conveniently be done by the network of FIG. 1.

The circuit of FIG. 1 comprises a voltage-divider 10 connected between a terminal 11 and ground. Another portion of the circuit includes three resistors 12, 13, and 14 connected in series between input terminal 15 and ground. The resistors 10 and 12 are provided with adjustable taps 10*a* and 12*a*, respectively, adapted for simultaneous manual adjustment by means of a knob 16 and unicontrol mechanism illustrated schematically at 17. The signal potential at the terminal 15 is applied to an adding amplifier 18*a* and to a subtracting amplifier 18*b*. The potential at the tap 10*a* is applied to amplifier 18*a* and 18*b* through a two-position switch 19 and conductors 23, 24, respectively. The outputs of the amplifiers 18*a*, 18*b* are connected to a signal indicator, such as a meter 20. The circuit of FIG. 1 also includes a two-position switch 21 interconnected for unicontrol with the switch 19 by a mechanism illustrated schematically at 22. Specifically, in its upper position, switch 21 connects the adjustable tap 12*a* to the input terminal 15, short-circuiting the upper portion of resistor 12, while switch 19 connects the adjustable tap 10*a* to subtracting amplifier 18*b*.

In its lower position, switch 21 connects adjustable tap 12$a$ to the junction of resistors 13 and 14, short-circuiting the lower portion of resistor 12 and resistor 13, while switch contact 19 connects the adjustable tap 10$a$ to adding amplifier 18$a$.

The circuit just described may be termed the "yellow" section of the circuit of FIG. 1. The corresponding elements in the "magneta" section of the network of FIG. 1 are represented by the same reference numerals as the "yellow" section increased by 20. The differential amplifiers 18$a$ and 18$b$ and meter 20 may be duplicated in the "magenta" section or they may be arranged to be selectively plugged in to either section. However, the taps 10$a$, 12$a$ and the switches 19, 21 of the "yellow" section are adjusted independently of the corresponding taps 30$a$, 32$a$ and switches 39, 41 of the "magenta" section, depending upon the brightness and saturation compressions and color corrections previously effected on the Y' and M' signals and the particular primary colors selected as set-up conditions for the over-prints.

In the "yellow" section of this network, tap 12$a$ of resistor 12 is set so that the voltage $e_y$ is made representative of $Y'/Y'_{ym}$ and, when $Y'=Y'_{ym}$, will have a value $E_{ky}$, a constant. The voltage $E_y$, the input voltage, represents the factor Y' and has a value $E_{sy}$, a constant, when $Y'=1$. In the "magenta" section of the network, corresponding parameters with an "$m$" subscript identify corresponding parameters of Equation 7.

If $E_y \geqq E_{sy}$, as indicated by the meter 20, switches 19 and 21 are operated to their upper positions. With this circuit configuration, it can be shown that if $E_y \geqq E_{sy}$, the signal voltage $e_y$ across resistor 14 of FIG. 1 is represented by the equation:

$$e_y=\frac{E_{ky}}{E_{sy}+X(E_{sy}-E_{ky})}\cdot E_y \tag{10}$$

If $E_{1,2}=E_y$ on over-print set-up color for $Y=M=1$ when $$E_{1,2}-X(E_{sy}-E_{ky})=E_{sy}$$

then $$X=\frac{E_{1,2}-E_{ky}}{E_{sy}-E_{ky}}$$

and $$e_y=\frac{E_{ky}}{E_{sy}+\left(\frac{E_{1,2}-E_{sy}}{E_{sy}-E_{ky}}\right)(E_{sy}-E_{ky})}\cdot E_y=E_{ky}\frac{E_y}{E_{1,2}} \tag{11}$$

On the other hand, if $E_y \leqq E_{sy}$, the switches 19 and 21 are operated to their lower positions and the output signal $e_y$ is represented by the relation:

$$e_y=\frac{E_{ky}}{E_{sy}-X(E_{sy}-E_{ky})}\cdot E_y \tag{12}$$

If $E_{1,2}=E_y$ on over-print setup color for $Y=M=1$ when $$E_{1,2}+X(E_{sy}-E_{ky})=E_{sy}$$

then $$X=\frac{E_{sy}-E_{1,2}}{E_{sy}-E_{ky}}$$

and $$e_y=\frac{E_{ky}}{E_{sy}-\left(\frac{E_{sy}-E_{1,2}}{E_{sy}-E_{ky}}\right)(E_{sy}-E_{ky})}\cdot E_y=E_{ky}\frac{E_y}{E_{1,2}} \tag{13}$$

Thus, the relationship between $e_y$ and the basic parameters is the same for either position of switches 19 and 21, under the assumed conditions.

The circuit relationships and the function relationships of the several parameters of the "magenta" section of the circuit of FIG. 1 are the same as described above for the "yellow" section, the parameter $e_m$ being representative of $M'/M'_{ym}$.

The factor $(1-Y'_{ym})$ is manually set in by adjustment of the knob 16 to adjust tap 10$a$ of resistor 10 in accordance with the measured reflectivity of the paper for the yellow-magenta over-print for particular inks on particular paper.

The product factor $$\frac{Y'}{Y'_{ym}}\cdot\frac{M'}{M'_{ym}}$$

(that is, $e_y \cdot e_m$) may be obtained by the approximation:

$$e_y\cdot e_m \simeq \text{Min.}\begin{cases} e_y \\ e_m \\ \left(\frac{e_y+e_m}{4}\right)^2 \end{cases} \tag{14}$$

In the instrumentation of relationship (14), the minimum of the signals $e_y$ and $e_m$ is first selected by impressing these signals on the cathode-follower isolation amplifiers 25 and 45 having cathode load resistors 26 and 46, respectively. The minimum of the amplified signals $e_y$, $e_m$ is selected by oppositely poled diodes 27, 47 of either the vacuum tube or semiconductor type, the junction of which is connected through a voltage-divider comprising series-connected resistors 50, 52 to a cathode-follower amplifier 51 having a cathode load resistor 53.

The quarter-square term of relationship (14) is instrumented by adding the amplified signals $e_y$ and $e_m$ at the outputs of amplifiers 25 and 45, respectively, through current-adding resistors 54 and 55, respectively, the amplified sum $(e_y+e_m)$ being applied with negative polarity to a wave-shaping amplifier 56 having a cathode load resistor 57. Across the input circuit of the amplifier 56 are connected a plurality of unilaterally conductive devices, such as semiconductor diodes 58, 59, and 60, progressively biased at higher positive potentials, from right to left as shown in the diagram, by means of a voltage-divider comprising resistors 61, 62, 63, and 64 connected across the source +B, −B, the diodes being connected to the junctions of the voltage-divider through current-limiting resistors 65, 66, and 67, respectively.

In the quarter-square circuit just described, as the summation signal $e_y+e_m$ increases negatively, the biases on the several diodes are progressively overcome and, as each diode becomes nonconductive, it permits a progressively larger portion of the input signal to be applied to the control grid of the amplifier 56. By appropriately selecting the values of the resistors 61–67, inclusive, the output signal of the amplifier 56, appearing across its load resistor 57, can be made to approximate the square of the input signal. In the example shown, there is a three-point approximation of the square-law curve but, obviously, any number of diodes may be utilized in similar parallel circuits to achieve any desired approximation of the ideal square-law curve.

The previously selected minimum of the amplified signals $e_y$, $e_m$ and the signal representative of the expression $$\left(\frac{e_y+e_m}{4}\right)^2$$

derived from the cathode load resistor 57, are applied to the minimum selector circuit comprising oppositely poled unilaterally conductive devices, such as semiconductor diodes 68 and 69, respectively, and the minimum of these two values is selected thereby and applied to the control electrode of an isolating cathode-follower amplifier 70 having a cathode load resistor 71.

The output signal of amplifier 70, representing approximately the product $(e_y \cdot e_m)$, as just described, is applied to terminal 11 and across resistors 10 and 30. The tap 10$a$ is set so that the portion of the applied signal appearing below the adjustable tap is $(1-Y'_{ym})$ of the total signal applied thereto, so that the signal output applied to either terminal 23 or 24 is representative of the second term of Equation 7, namely, $$(1-Y'_{ym})\cdot\frac{Y'}{Y'_{ym}}\cdot\frac{M'}{M'_{ym}}$$

In a similar manner, the signal output of the "magenta" section of the circuit of FIG. 1 is applied to either terminal 43 or 44 and is representative of the second term of Equation 8:

$$(1-M'_{ym})\cdot\frac{Y'}{Y'_{ym}}\cdot\frac{M'}{M'_{ym}}$$

Referring now to FIG. 2 of the drawings, there is represented schematically a complete system for developing a corrected density-factor signal for the reproduction of half-tone color images by printing processes, compensated for errors due to multicolor over-printing. This apparatus includes at least three input terminals, such as the terminals 80, 81, and 82, for supplying signals individually representative of a corresponding number of primary color components of a scanned color copy. These input signals may be uncorrected signals representative of red, blue, and green color components and derived directly from a photoelectric engraving machine such as that described and claimed in Patent Re. 23,914 to Boyajean, or as indicated, they may comprise signals Y′, M′, and C′ previously corrected as described and claimed in the copending application of applicant and Vernon L. Marquart, Serial No. 12,088, filed March 1, 1960, or applicant's copending application Serial No. 102,873 filed April 13, 1961, or both.

The apparatus of FIG. 2 further comprises a plurality of circuit means coupled to selected of such terminals 80, 81, 82 for deriving a plurality of signals, each representative of the color component corresponding to one of its associated terminals appearing in each color over-print including that primary color and having values of either polarity, depending upon the printing media in use, i.e., upon the reflectivity of the printed paper and the characteristics of the inks. This plurality of circuit means comprises the unit 83 for deriving signals representative of the yellow and magenta color components appearing in the yellow-magenta over-print and having input terminals **83*a*, 83*a* coupled to the input terminals 80 (Y′ input) and 81 (M′ input); the unit 84 for deriving signals representative of the yellow and cyan color components appearing in the yellow-cyan over-print and having input terminals 84*a*, 84*a* coupled to terminals 80 (Y′ input) and 82 (C′ input); and unit 85 for deriving signals represenstative of the cyan and magenta color components appearing in the magenta-cyan over-print and having input terminals 85*a*, 85*a* connected to terminals 81 (M′ input) and 82 (C′ input). Each of the computer units 83, 84, and 85 may be of the form represented in FIG. 1 which, it will be noted, has a pair of input terminals 15, 35 and four output terminals 23, 24 and 43, 44**.

Each of the signal outputs of each of the units 83, 84, and 85 may be represented by the generalized relation $$\frac{Z^1}{Z^1_{1,2}}\cdot\frac{Z^2}{Z^2_{1,2}}$$

in which each of the parameters has the significance stated above.

Since the unit 83, as represented in FIG. 1, includes circuit arrangements for computing the term $$\frac{Y'}{Y'_{ym}}\cdot\frac{M'}{M'_{ym}}$$

the signal representative of cyan in the yellow-magenta over-print may be derived by applying the signal appearing at the terminal 11 of FIG. 1, corresponding to terminal **83*b* of FIG. 2, to a resistor 86 having an adjustable contact 86*a* adapted to be set manually by a knob 87 in accordance with the factor $C'_{ym}$. The signal appearing at the adjustable contact 86*a* is selectively applied to either a terminal 88 or a terminal 89 by a two-position switch 90. Similarly, a signal representative of magenta in the yellow-cyan over-print may be derived by applying the signal from the corresponding terminal 84*b* of unit 84 to a resistor 91 having an adjustable contact 91*a* connected to a switch 92 for applying the signal at contact 91*a* selectively either to terminal 93 or terminal 94. The contact 91*a* is similarly adapted to be set manually by a knob 95 in accordance with the factor $M'_{yc}$. Again, a corresponding signal representative of the yellow in the magneta-cyan over-print and appearing at terminal 85*b* of unit 85 is applied to a resistor 96 having an adjustable contact 96*a* connected by way of a switch 97 to either of two terminals 98 or 99, the adjustable contact 96*a* being adapted to be set manually by a knob 100** in accordance with the factor $Y'_{mc}$.

The apparatus of the invention further includes a plurality of circuit means individually coupled to the circuit means or units 83, 84, 85 for deriving a plurality of signals each representative of the neutral-density component appearing in a color over-print and having values of either polarity, depending upon the printing media in use. This last means includes a resistor 101 connected to terminal **83*b* and having an adjustable contact 101*a* connected by way of a switch 102 to either of two terminals 103 or 104; a resistor 105 connected to terminal 84*b* and having an adjustable contact 105*a* connected by way of a switch 106 to either of two terminals 107 or 108; and a resistor 109 connected to terminal 85*b* and having an adjustable contact 109*a* connected by way of a switch 110 to either of two terminals 111 or 112. The adjustable contacts 101*a*, 105*a*, and 109*a* are adapted to be manually set by means of knobs 113, 114, and 115**, respectively, in accordance with the factors $1-K'_{ym}$, $1-K'_{yc}$, $1-K'_{mc}$.

As explained hereinafter, the arrangements just described for deriving signals representative of the neutral-density components in the several color over-prints may be used alone. Preferably, however, additional correction signals are derived representative of the neutral-density factors present in the single inks. To this end, there are provided the computer units 116, 117, and 118 for computing the "black-in-yellow," "black-in-magenta," and "black-in-cyan" neutral-density components. The circuitry of each of these units is identical so that only that of the unit 116 is shown in detail.

The neutral-density signals applied to the units 116, 117, and 118 may be uncorrected signals derived directly from the scanning of the color copy but preferably they comprise neutral-density signals corrected for single ink printing, as described in applicant's aforesaid copending application Serial No. 102,873. In that event, the input terminals **116*a*, 116*a* of unit 116 will be energized from the output signal of the unit 40 of that application; the input terminals 117*a*, 117*a*, of unit 117 will be energized from the output signal of the unit 70 of that application; and the input terminals 118*a*, 118*a* of unit 118 will be energized from the output signal of the unit 80** of that application.

To derive the "black-in-yellow" signal, there is connected across the terminals **116*a*, 116*a* a voltage-divider comprising resistors 119, 120, and 121 connected in series. The resistor 120 is provided with an adjustable contact 120*a* adapted to be set manually by a control knob 122 to adjust the amount of neutral density for a given yellow patch, depending upon the color purity of the ink or other reproducing medium being used. Also connected across the terminals 116*a*, 116*a* is an impedance-matching resistor network provided so that adjustment of the contact 120 will not alter the loading on the preceding circuitry. This network comprises a first pair of fixed resistors 123, 124 connected in series across the terminals 116*a*, 116*a*, a second pair of resistors 125, 126 also connected across the terminals 116*a*, 116*a*, and a resistor 127** having an adjustable contact 127*a* and interconnecting the junctions of resistors 123, 124 and 125, 126. The adjustable contacts 120*a* and 127*a* are arranged to be adjusted in unison by the knob 122 through a mechanism indicated schematically at 128. The adjustable contacts 120*a* and 127*a* are electrically connected to output terminals 116*b*, 116*b* of the unit 116. The "black-in-magenta" unit 117 and the "black-in-cyan" unit 118, are, as stated, identical in circuitry to unit 116 and are provided with output terminals 117*b*, 117*b* and 118*b*, 118*b*, respectively.

The apparatus of the invention further comprises circuit means for summing all of the neutral-density signals. This may be effected by a summation unit 129 of a circuitry described hereinafter. To this end, the terminals 103, 104; 107, 108; and 111, 112, as well as the terminals 116*b*, 116*b*; 117*b*, 117*b*; and 118*b*, 118*b* are all connected to input terminals 129*a* of unit 129 and the summation signal developed at output terminal 129*b* is representative of the corrected neutral-density signal to be applied to all of the color density-factor correction channels.

The signal appearing at the output terminal 129*b* is also developed at a second output terminal 129*c* and is applied to a resistor 130 having a contact 130*a* manually adjustable by a knob 131 to permit setting the maximum dot area. The adjustable contact 130*a* is connected to the control electrode of a cathode-follower amplifier 132 having a load resistor 133 across which is developed a neutral-density or "black printer" signal applied to terminal 134. It will be understood that this signal may be utilized directly for preparing a black printer plate for use in a four-color printing process.

The apparatus of the invention further comprises a plurality of circuit means, each coupled to the circuit means or computers 83, 84, and 85 and to the black summation unit 129 for summing all of the derived signals corresponding to a given color component. The circuitry of one of the summation units, for example the unit in the yellow channel, is represented in the unit 135. This summation unit includes two summation amplifiers 136 and 137, the latter being connected to operate as a cathode-follower having a cathode load resistor 138 common to the amplifier 136. A load resistor 139 is provided for the amplifier 136 across which is developed the corrected yellow signal applied to output terminal 140. This signal may be utilized for forming a yellow color-separation printing plate.

The correction signals from the units 83, 84, and 85 of a given corresponding polarity, for example negative polarity, are applied to the control electrode of the amplifier 136 from output terminals 83*c*, 84*c*, 85*c*, respectively, through current-adding resistors 141, 142, and 143 in parallel, while the neutral-density signal is added through a parallel connected resistor 144. The amplifier 136 may be termed the "subtracting" amplifier. In addition, an adjustable potential, representative of desired undercolor removal, is derived from a voltage-divider comprising a resistor 145 having an adjustable contact 145*a* and connected to the output terminal 129*c* of the black summation amplifier 132. The contact 145*a* is adapted to be manually adjusted, as by a control knob 146, and the signal at that contact is applied to a cathode-follower amplifier 147 having a cathode load resistor 148 the signal across which is applied through a current-adding resistor 149 to those applied to the control electrode of the amplifier 136, as described above.

The signals of opposite polarity developed by the units 83, 84, and 85 are derived from their output terminals 83*d*, 84*d*, and 85*d*, respectively, and added through current-adding resistors 150, 151, and 152 and applied to the control electrode of the amplifier 137, which may be termed the "adding" amplifier. Also added into this circuit is a signal representative of Y′ by connecting the input terminal 80 through a current-adding resistor 153 to the control grid of amplifier 137.

The magneta summation unit 154 is similarly connected to the output terminals 83*e*, 84*e*, and 85*e*, respectively, for receiving signals from the units 83, 84, and 85, respectively, of one polarity and to the output terminals 83*f*, 84*f*, and 85*f* of the units 83, 84, and 85, respectively, for receiving signals of the opposite polarity. It is also connected to the M′ input terminal 81, the neutral-density terminal 129*b*, and to black printer terminal 129*c* in the same manner as the yellow summation unit 135. The output signal of the unit 154 is applied to a terminal 155 at which appears the corrected magenta printer signal which may be utilized for forming a magenta color-separation printing plate.

In an analogous manner, the cyan summation unit 156 is connected to the terminals 88, 93, and 98 for receiving correction signals of one polarity and to the terminals 89, 94, and 99 for receiving correction signals of the opposite polarity. It is also connected to the C′ input terminal 82, to the terminal 129*b* of unit 129 for receiving a neutral-density correction signal, and to the black printer terminal 129*c*. The output signal of the unit 156 is connected to the output terminal 157 at which appears the corrected cyan signal which may be utilized directly for forming a cyan color-separation printing plate.

It will be understood that the summation units 154, 156, and 129 are of the same form and circuitry as the yellow summation unit 135, although the black summation unit 129 will have additional parallel-connected current-adding resistors in the input circuits of its amplifiers corresponding to the amplifiers 136 and 137 of the unit 135.

It is believed that the operation of the complete system, represented in FIG. 2, will be apparent to those skilled in the art from the foregoing description. In brief, the potentiometer taps 10*a*, 12*a*, 30*a*, and 32*a* of FIG. 1, the corresponding taps of the units 84 and 85 of FIG. 2, and the taps 86*a*, 91*a*, 96*a*, 101*a*, 105*a*, and 109*a* of FIG. 2 are initially set as described above in accordance with the printing media in use. Specifically, the potentiometers 10, 12 and switches 19, 21 are set to cause the meters 20 to read certain values, corresponding to $E_{sy}$, $E_{sm}$, for each position of switch 19, for the particular yellow-magenta over-print color. This process is repeated with respect to the switches and potentiometers of each of the channels of each of the computers. Considering first the yellow channel including the units 83, 84, and 85, this channel will develop signals representative of the second, third, and fourth terms of Equation 5 in the manner explained above with respect to the development of a signal representative of the second term by the circuit of FIG. 1. The first term of Equation 5, being the input signal Y′, is, as described, added into the summation amplifier through the current-adding resistor 153. The differential amplifier, comprising the two amplifier tubes 136, 137, then algebraically combines the derived summation signals of opposite polarity to develop a summation signal which is representative of the sum of the four terms of Equation 5. This is, under the simplifying assumptions made, the the desired yellow printer signal Y which appears at the output terminal 140. As stated above, equations homologous to Equation 5 for the magenta and cyan channels can be readily written and these homologous equations are instrumented by the "magenta" sections of the circuits of FIG. 1, as appearing in the units 83, 84, and 85, together with the magenta summation amplifier unit 154, while the cyan channel, comprising the units 86–90, inclusive, 91–95, inclusive, and 96–100, inclusive, together with the cyan summation unit 156, similarly instrument the homologous equation for developing the corrected cyan printer signal which appears at the terminal 157.

Also in analgous fashion, the neutral-density channel, including the units 101–104, inclusive, 105–108, inclusive, and 109–112, inclusive, together with the single-ink correction signals developed by the units 116, 117, and 118, constitute an instrumentation of Equation 6 and develop an output signal which, after adjustment by the manual undercolor removal voltage-divided 130, 130*a* and amplification in the unit 132, constitutes the black printer signal which may be utilized to form a black printer plate in a four-color printing process.

In more general terms, the switches 19 and 39 of unit 83, as shown in FIG. 1, and the corresponding switches in the units 84 and 85 in the yellow and magenta channels, the switches 90, 92, and 97 in the cyan channel, and the switches 102, 106, and 110 comprise a plurality of switching means associated with the computer circuits of the units 83, 84, and 85 in the yellow and magenta channels and the computer circuits comprising the elements 86–90, inclusive, 91–94, inclusive, and 96–99, inclusive, in the cyan channel, each having a pair of output terminals for determining whether the signals at their respective adjustable taps are added to or subtracted from the corresponding signals from the others of the units 83, 84, 85 in the summation amplifiers. The switches 21 and 41 of unit 83 and the corresponding switches in the units 84 and 85 are effective to select augmented or diminished values of color-representative signals, as explained above. The amplifier 136 in the unit 135 and the corresponding amplifiers in the units 154 and 156 comprise a plurality of circuit means each coupled to one set of terminals of the switching means just described for summing all of the derived signals of a given polarity corresponding to a given color component. Similarly, the amplifier 137 in the unit 135 and the corresponding amplifiers of the units 154 and 155 comprise a plurality of circuit means each coupled to the other set of terminals of the group of switches associated with the computer circuits of the units 83, 84, and 85 and the units comprising elements 86–90, inclusive, 91–94, inclusive, and 96–99, inclusive, for summing all of the derived signals of opposite polarity corresponding to a given color component. Similarly, the amplifier in the unit 129, corresponding to the amplifier 136 of unit 135, comprises circuit means coupled to one set of switch terminals associated with the computer circuits in the black channel for summing neutral-density signals of a given polarity while the amplifier in the unit 129, corresponding to the amplifier 137 of unit 135, comprises circuit means coupled to the other set of terminals of the switches described for summing neutral-density signals of opposite polarity. Finally, the amplifiers 136 and 137 of unit 135, connected as a differential amplifier, together with the corresponding amplifiers of the summation units 154 and 156, comprise circuit means for algebraically combining the signals appearing at the input terminals 80, 81, and 82 with the corresponding summation signals of opposite polarities individually developed by the summation amplifiers 136 and 137 and their counterparts in the units 154 and 156 and the neutral-density summation signal, to develop the final color printer signal as it appears at each of the output terminals 140, 155, and 157.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for developing a density-factor correction for the reproduction of half-tone color images by printing processes to compensate for errors due to multicolor over-printing comprising:

(a) at least two input terminals for supplying signals individually continuously representative of a corresponding number of primary color components of a scanned color copy;

(b) a first plurality of circuit means coupled to selected of said terminals for deriving a plurality of signal Z, each represented by the relation:

$$Z=Z^1+(1-Z^1_{1.2})\cdot\frac{Z^1}{Z^1_{1.2}}\cdot\frac{Z^2}{Z^2_{1.2}}$$

where the term Z with a superscript refers to a signal representative of a given primary color component and the term Z with a subscript refers to a signal representative of an over-print color component;

(c) a second plurality of circuit means each coupled to aforesaid circuit means for summing all of said derived signals corresponding to a given color component;

(d) and circuit means for algebraically combining the signal appearing at each input terminal with the corresponding signal developed by one of said second circuit means to develop the corrected color signal.

2. Apparatus for developing a density-factor correction for the reproduction of half-tone color images by printing processes to compensate for errors due to multicolor over-printing comprising:

(a) at least three input terminals for supplying signals individually representative of a corresponding number of primary color components of a scanned color copy;

(b) a first plurality of circuit means coupled to selected of said terminals for deriving a plurality of signals each representative of the color component corresponding to its associated terminal appearing in each color over-print including that primary color;

(c) a second plurality of circuit means individually coupled to said first plurality of circuit means for deriving a plurality of signals each representative of the neutral-density component appearing in a color over-print;

(d) third circuit means for summing said neutral-density signals;

(e) a fourth plurality of circuit means each coupled to aforesaid first circuit means and to said third circuit means for summing all of said derived signals corresponding to a given color component;

(f) and circuit means for algebraically combining the signal appearing at each input terminal with the corresponding signal developed by one of said fourth circuit means to develop the corrected color signal.

3. Apparatus for developing a density-factor correction for the reproduction of half-tone color images by printing processes to compensate for errors due to multicolor over-printing comprising:

(a) at least three input terminals for supplying signals individually representative of a corresponding number of primary color components of a scanned color copy;

(b) a first plurality of circuit means coupled to selected of said terminals for deriving a plurality of signals each representative of the color component corresponding to its associated terminal appearing in each color over-print including that primary color and having values of either polarity depending upon the printing media in use;

(c) a second plurality of circuit means coupled to said first circuit means for summing all of said derived signals of a given polarity corresponding to a given color component;

(d) a third plurality of circuit means coupled to said first circuit means for summing all of said derived signals of opposite polarity corresponding to a given color component;

(e) and circuit means for algebraically combining the signal appearing at each input terminal with the corresponding summation signals of opposite polarities developed by said second and third circuit means to develop the corrected color signal.

4. Apparatus for developing a density-factor correction for the reproduction of half-tone color images by printing processes to compensate for errors due to multicolor over-printing comprising:

(a) at least three input terminals for supplying signals individually representative of a corresponding number of primary color components of a scanned color copy;

(b) a first plurality of circuit means coupled to each of said terminals for deriving a plurality of signals each representative of the color component corresponding to its associated terminal appearing in each color over-print including that primary color and having values of either polarity depending upon the printing media in use;

(c) a second plurality of circuit means individually coupled to said first plurality of circuit means for deriving a plurality of signals each representative of the neutral-density component appearing in a color over-print and having values of either polarity depending upon the printing media in use;

(d) a third plurality of circuit means coupled to said first circuit means for summing all of said derived signals of a given polarity corresponding to a given color component;

(e) a fourth plurality of circuit means coupled to said first circuit means for summing all of said derived signals of opposite polarity corresponding to a given color component;

(f) a fifth circuit means coupled to said second circuit means for summing said neutral-density signals of said given polarity;

(g) a sixth circuit means coupled to said second circuit means for summing said neutral-density signals of opposite polarity;

(h) and circuit means for algebraically combining the signal appearing at each input terminal with the corresponding summation signals of opposite polarities developed by said third and fourth circuit means and said neutral-density summation signals to develop the corrected color signal.

5. In an apparatus for developing a density-factor correction for the reproduction of half-tone color images by printing processes to compensate for errors due to multicolor over-printing, an over-print correction computer comprising:

(a) first input terminals for supplying a first signal representative of $Z^1$;

(b) second input terminals for supplying a signal representative of $Z^2$;

(c) a first circuit coupled to said first input terminals including means adjustable in accordance with the factor $(1-Z^1{}_{1,2})$ for deriving a third signal;

(d) a second circuit coupled to said first input terminals for deriving a fourth signal representative of the factor $$\frac{Z^1}{Z^1_{1,2}} \cdot \frac{Z^2}{Z^2_{1,2}}$$

where the term Z with a superscript refers to a signal representative of a given primary color component and the term Z with a subscript refers to a signal representative of an over-print color component;

(e) and circuit means for deriving a correction signal representative approximately of the product of said two derived signals.

6. In a napparatus for developing a density-factor correction for the reproduction of half-tone color images by printing processes to compensate for errors due to multicolor over-printing, an over-print correction computer comprising:

(a) first input terminals for supplying a first signal representative of $Z^1$;

(b) second input terminals for supplying a second signal representative of $Z^2$;

(c) a voltage-divider resistance means coupled to said first input terminals including a tap adjustable in accordance with the factor $(1-Z^1{}_{1,2})$ for deriving a third signal;

(d) a second circuit coupled to said first input terminals for deriving a fourth signal representative of the factor $$\frac{Z^1}{Z^1_{1,2}} \cdot \frac{Z^2}{Z^2_{1,2}}$$

where the term Z with a superscript refers to a signal representative of a given primary color component and the term Z with a subscript refers to a signal representative of an over-print color component;

(e) circuit means for deriving a correction signal representative approximately of the product of said two derived signals;

(f) and means for applying said fourth signal to said voltage-divider means, whereby said third signal represents a desired over-print correction signal.

References Cited by the Examiner

UNITED STATES PATENTS

| | | | |
|---|---|---|---|
| 2,981,792 | 4/1961 | Farber | 178—5.2 |
| 2,993,087 | 7/1961 | Hell | 178—5.2 |

DAVID G. REDINBAUGH, *Primary Examiner.*

ROBERT SEGAL, *Examiner.*